United States Patent [19]
Sydansk

[11] Patent Number: 4,957,166
[45] Date of Patent: Sep. 18, 1990

[54] LOST CIRCULATION TREATMENT FOR OIL FIELD DRILLING OPERATIONS

[75] Inventor: Robert D. Sydansk, Littleton, Colo.
[73] Assignee: Marath Oil Company, Findlay, Ohio
[21] Appl. No.: 419,862
[22] Filed: Oct. 11, 1989

Related U.S. Application Data

[63] Continuation-in-part of Ser. No. 380,565, Jul. 14, 1989.
[51] Int. Cl.$^5$ .................. E21B 21/08; E21B 33/138
[52] U.S. Cl. ................... 166/295; 166/292; 166/300; 175/48; 175/72
[58] Field of Search ................. 166/292–295, 166/300, 250; 175/48, 72; 252/8.512; 523/130

[56] References Cited

U.S. PATENT DOCUMENTS

| | | | |
|---|---|---|---|
| Re. 32,114 | 4/1986 | Argabright et al. | 166/252 |
| 3,208,524 | 9/1965 | Horner et al. | 175/72 X |
| 3,265,631 | 8/1966 | Jordan | 252/8.512 X |
| 3,818,998 | 6/1974 | Hessert | 172/72 |
| 3,909,421 | 9/1975 | Gaddis | 166/275 X |
| 4,043,921 | 8/1977 | Hessert et al. | 252/8.51 |
| 4,183,406 | 1/1980 | Lundberg et al. | 175/72 X |
| 4,282,928 | 8/1981 | McDonald et al. | 166/274 |
| 4,643,255 | 2/1987 | Sandiford et al. | 166/295 |
| 4,664,816 | 5/1987 | Walker | 175/72 X |
| 4,675,119 | 6/1987 | Farrar et al. | 252/8.514 |
| 4,683,949 | 8/1987 | Sydansk et al. | 166/270 |
| 4,688,639 | 8/1987 | Falk | 166/295 |
| 4,706,754 | 11/1987 | Smith | 166/295 |
| 4,722,397 | 2/1988 | Sydansk et al. | 166/295 |
| 4,723,605 | 2/1988 | Sydansk | 166/295 |
| 4,724,906 | 2/1988 | Sydansk | 166/295 |
| 4,726,906 | 2/1988 | Chen et al. | 252/8.514 |
| 4,730,674 | 3/1988 | Burdge et al. | 166/295 |
| 4,730,675 | 3/1988 | Wygant et al. | 166/295 |
| 4,740,319 | 4/1988 | Patel et al. | 252/8.515 |
| 4,744,418 | 5/1988 | Sydansk | 166/270 |
| 4,744,419 | 5/1988 | Sydansk et al. | 166/270 |
| 4,770,245 | 9/1988 | Sydansk | 166/295 |
| 4,779,680 | 10/1988 | Sydansk | 166/300 |
| 4,817,719 | 4/1989 | Jennings, Jr. | 166/292 |
| 4,819,727 | 4/1989 | Jennings, Jr. | 166/292 |
| 4,844,168 | 7/1989 | Sydansk | 166/270 |

OTHER PUBLICATIONS

Messenger, Joseph U., Lost Circulation, PennWell Publishing Co., Tulsa, OK, 1981, pp. 44–56.
Shuttleworth and Russel, *Journal of the Soc. of Leather Trades' Chemists*, "The Kinetics of Chrome Tannage Part I.", United Kingdom, 1965, v. 49, pp. 133–154; Part III., United Kingdom, 1965, v. 49, pp. 251–260; Part IV., United Kingdom, 1965, v. 49, pp. 261–268.
Von Erdman, *Das Leder*, "Condensation of Mononuclear Chromium (III) Salts to Polynuclear Compounds", Eduard Roether Verlag, Darmstadt Germany, 1963, v. 14, p. 249.
Jdy, Marvin J., *Chromium, Volume 1: Chemistry of Chromium and its Compounds*, Reinhold Publishing Corp., N.Y., 1956, pp. 229–233.
Cotton and Wilkinson, *Advanced Inorganic Chemistry 3rd Ed.*, John Wiley and Sons, Inc., N.Y., 1972, pp. 836–839.
R. D. Sydansk, A New Conformance-Improvement–Treatment Chromium (III) Gel Technology, SPE/DOE 17329, presented at SPE/DOE Enhanced Oil Recovery Symposium, Tulsa, Oklahoma, Apr. 17–20, 1988.
R. D. Sydansk et al., Field Testing of a New Conformance-Improvement-Treatment Chromium (III) Gel Technology, SPE/DOE 17383, presented at SPE/DOE Enhanced Oil Recovery Symposium, Tulsa, Oklahoma, Apr. 17–20, 1988.

*Primary Examiner*—George A. Suchfield
*Attorney, Agent, or Firm*—Jack L. Hummel; Jack E. Ebel

[57] ABSTRACT

A nonflowing crosslinked polymer gel is employed in a lost circulation treatment for reducing lost circulation during an oil field drilling operation. The nonflowing gel comprises a carboxylate-containing polymer, a chromic carboxylate crosskinging agent, and an aqueous solvent.

47 Claims, No Drawings

LOST CIRCULATION TREATMENT FOR OIL FIELD DRILLING OPERATIONS

This is a continuation-in-part patent application of co-pending U.S. patent application Ser. No. 380,565, filed on July 14, 1989.

BACKGROUND OF THE INVENTION

1. Technical Field

The invention relates to a process for drilling into a subterranean hydrocarbon-bearing formation and more particularly to a process for minimizing lost circulation of a drilling fluid when drilling into a subterranean hydrocarbon-bearing formation.

2. Background Information

A drilling fluid is a fluid which is circulated from an earthen surface down through a drilled out wellbore to a drilling face and back to the surface when drilling into a subterranean formation which contains hydrocarbons. Drilling fluids are specifically designed to perform a number of functions, including cooling and lubricating the drill bit, removing drill cuttings from the wellbore, supporting the weight of the drill pipe and drill bit, providing a hydrostatic head to maintain the integrity of the wellbore walls, preventing significant flow of fluids across the wellbore face into the wellbore and vice versa. The most common conventional drilling fluids known in the art are termed "drilling muds", which are dispersions of solid particles in a liquid. Examples of drilling muds are aqueous dispersions of clays (e.g. bentonite) and/or gypsum.

A common problem encountered during drilling operations is "lost circulation", which is the excessive flow of drilling fluids out of the wellbore. The drilling fluids are either lost to the formation matrix or to voids in direct communication with the wellbore. Lost circulation is undesirable from an economic standpoint because it requires one to continually replenish the wellbore with costly drilling fluid. Lost circulation is also undesirable from an operational and safety standpoint because it can damage the pay zone and in extreme cases it can result in a blowout of the hydrocarbon zone followed by a well fire.

Drilling fluids are typically formulated to contain one or more viscosifiers, such as polymeric additives, in an effort to control lost circulation. See, for example U.S. Pat. No. 4,740,319 to Patel et al, 4,726,906 to Chen et al, U.S. Pat. No. 4,675,119 to Farrar et al and U.S. Pat. No. 4,282,928 to McDonald et al. Materials which inhibit the flow of drilling fluids from the wellbore into the formation, are termed "lost circulation fluids".

Unfortunately many lost circulation fluids known in the art are unsatisfactory because of operational limitations restricting their utility. For example, some lost circulation fluids are ineffective in the presence of high salt concentration brines. Others undergo thermal degradation when subjected to high operational temperatures. The most significant shortcoming of lost circulation fluids is their inability to effectively control lost circulation encountered when drilling through voids occurring in the formation.

Thus, a need exists for a lost circulation treatment using a material which effectively prevents or reduces lost circulation of drilling fluids, particularly in cases where lost circulation fluids are ineffective. Further, a need exists for a lost circulation treatment which has sufficient strength and integrity to minimize lost circulation into voids in direct communication with the wellbore, such as fractures, fracture networks, vugs, washouts, cavities, and the like.

SUMMARY OF THE INVENTION

The present invention provides a process for preventing or reducing lost circulation when drilling by conventional methods into a subterranean formation. The process employs a continuous, nonflowing, solid, crosslinked, polymer gel, in a lost circulation treatment. In one embodiment of the treatment, the nonflowing gel is placed in the wellbore or voids as a preventative before lost circulation occurs. In another embodiment, the nonflowing gel is placed in the wellbore or voids in a remedial role only after lost circulation has been detected.

The utility of the present process is attributable to the specific composition of the gel used in the lost circulation treatment. The polymer gel composition comprises a carboxylate-containing polymer, a chromic carboxylate complex crosslinking agent and an aqueous solvent. The gel constituents are premixed at the surface and injected into a wellbore in a flowing condition. The gel components crosslink to completion in situ to form a continuous nonflowing gel, which effectively inhibits the flow of drilling fluid from the wellbore into voids or the formation matrix. The gel is relatively nondamaging to the formation matrix and is reversible if desired.

The gel employed in the present invention has utility over a broad range of operating conditions. The gel is effective in the presence of high salt concentration brines and is resistant to thermal degradation at temperatures generally encountered during drilling operations. Furthermore, the gel can be formulated over a very broad range of onset times and strengths. Nevertheless, the gel is relatively insensitive to minor variations in conditions under which it is formulated. Thus, the gel is readily suited for on-site preparation in the field where process controls are often imprecise, such as remote hostile onshore and offshore locations.

In addition to the above recited operational advantages, the gel employed in the present invention can offer practical advantages over lost circulation treatments known in the art. The present process is cost effective because the gel components are readily available and relatively inexpensive. The gel can be applied with conventional oil field equipment. Finally, the gel composition is relatively nontoxic to the environment and safe to handle.

Gels compositionally related to those used in the process of the present invention have known utility in conformance improvement treatment (CIT) processes as shown in U.S. Pat. Nos. 4,683,949 and 4,744,499 to Sydansk et al, which are incorporated herein by reference. However, the performance requirements of lost circulation gels are different from those of CIT gels. The composition and resulting properties of the lost circulation fluid must b e specific to the performance requirements of the drilling operation. The present invention fills a need in the art for a process, which utilizes a polymer gel composition to control lost circulation when drilling hydrocarbon-related wellbores under a broad range of conditions.

DESCRIPTION OF PREFERRED EMBODIMENTS

The present invention is a process to minimize lost circulation when conducting drilling operations in accordance with methods known to those skilled in the art. One initiates the process of the present invention either as a lost circulation preventative or as a remedy when lost circulation has already occurred. Lost circulation is indicated by the entry of drilling fluid into a newly drilled formation, a significantly reduced volume of drilling fluid returning to the surface, or an inability to maintain a column of drilling fluid in the wellbore.

The process is initiated by formulating a flowing gel composition at the surface which is a precursor to a nonflowing crosslinked polymer gel. The term "crosslinked polymer gel" as used herein is directed to a continuous three-dimensional polymeric network having a high molecular weight. The polymer network is the result of crosslinking one or more polymer molecules. Crosslinking is the bonding of functional groups on the same or different polymer molecules to one another. The crosslinked gel has a liquid medium such as water which is contained within the solid polymeric network. The unique containment of the liquid medium in the polymer network provides a gel upon complete gelation which is characterized as "nonflowing".

Nonflowing gels do not fully conform to the shape of their container, but may deform somewhat under the force of gravity. In contrast flowing gels fully conform to the shape of their containers. Nonflowing gels range in properties from highly deformable or elastic gels to rigid or ringing gels. Rigid gels, which do not deform at all under the force of gravity, are preferred in the present invention.

The gel composition of the present process comprises a polymer, a crosslinking agent and an aqueous solvent. The polymer is a carboxylate-containing polymer which is a crosslinkable water-soluble polymer having one or more carboxylate groups or, alternatively, having one or more groups capable of being hydrolyzed to carboxylate groups (e.g., amide groups). The carboxylate-containing polymer satisfying there criteria may be either a synthetic polymer or a biopolymer. The average molecular weight of the polymer is in the range of about 10,000 to about 50,000,000, preferably about 100,000 to about 20,000,000 and most preferably about 150,000 to about 15,000,000.

The preferred polymer of the present invention is an acrylamide polymer, which is defined herein as a crosslinkable, water-soluble, synthetic polymer containing one or more acrylamide groups. Useful acrylamide polymers include polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in a carboxylate form. Partially hydrolyzed polyacrylamide (PHPA) is an acrylamide polymer having at least 1%, but not 100%, of the acrylamide groups in a carboxylate form. The acrylamide polymer may be prepared according to any conventional method known in the art, but preferably has the specific properties of an acrylamide polymer prepared according to the method disclosed by U.S. Pat. No. Re. 32,114 to Argabright et al incorporated herein by reference.

The crosslinking agent of the present invention is a chromic carboxylate complex. The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions (e.g., chloride, sodium, sulfate, or nitrate), which function merely to balance the electrical charge of the complex, or one or more water molecules may be associated with each complex. Representative formulae of such complexes include:

$[Cr_3(CH_3CO_2)_6(OH)_2]^{1+}$;
$[Cr_3(OH)_2(CH_3CO_2)_6]NO_3.6H_2O$;
$[Cr_3(H_2O)_2(CH_3CO_2)_6]^{3+}$;
$[Cr_3(H_2O)_2(CH_3CO_2)_6](CH_3CO_2)_3.H_2O$;
etc.

"Trivalent chromium" and "chromic ion" are equivalent terms encompassed by the term "chromium III" species as used herein.

The carboxylate species are advantageously derived from water-soluble salts of carboxylic acids, especially low molecular weigh mono-basic acids. Carboxylic species derived from salts of formic, acetic, propionic, and lactic acid, substituted derivatives thereof and mixtures thereof are especially preferred. The carboxylate species include the following water-soluble species: formate, acetate, propionate, lactate, substituted derivatives thereof, and mixtures thereof.

A host of complexes of the type described above and their method of preparation are well known in the leather tanning art. These complexes are described in Shuttleworth and Russel, *Journal of the Society of Leather Trades' Chemists*, "The Kinetics of Chrome Tannage Part I.," United Kingdom, 1965, v, 49, p. 133–154; "Part III.," United Kingdom, 1965, v. 49, p. 251–260; "Part IV.," United Kingdom, 1965, v. 49, p, 261–268; and Von Erdman, *Das Leder*, "Condensation of Mononuclear Chromium (III) Salts to Polynuclear Compounds," Eduard Roether Verlag, Darmstadt Germany, 1963, v, 14, p. 249; and incorporated herein by reference. Udy, Marvin J., *Chromium, Volume 1: Chemistry of Chromium and its Compounds*, Reinhold Publishing Corp., N.Y., 1956, pp. 229–233; and Cotton and Wilkinson, *Advanced Inorganic Chemistry 3rd Ed.*, John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion e.g., $CrCl_3$, may also be combined with the crosslinking agent complex to accelerate gelation of the polymer solution, as described in U.S. Pat. No. 4,723,605 to Sydansk, which is incorporated herein by reference.

The gel composition is formed by admixing the polymer, the crosslinking agent and aqueous solvent at the surface. Surface admixing broadly encompasses inter alia mixing the gel components in bulk at the surface prior to injection or simultaneously mixing the components at or near the wellhead by in-line mixing means while injecting them.

Admixing is accomplished, for example, by dissolving the starting materials for the crosslinking agent in appropriate aqueous solvent. Exemplary starting materials include solid $CrAc_3 \cdot H_2O$, solid $Cr_3Ac_7(OH)_2$, or a solution labeled "Chromic Acetate 50% Solution" commercially available, for example, from McGean-Rohco Chemical Co., Inc., 1250 Terminal Tower, Cleveland, Ohio 44113, U.S.A. The crosslinking agent solution is then mixed with an aqueous polymer solution to produce the gel. Among other alternative, the starting materials for the crosslinking agent can be dissolved directly in the aqueous polymer solution to form the gel in a single step.

The present process enables the practitioner to customize or tailor-make a nonflowing gel having a predetermined gelation rate and predetermined gel properties of strength and thermal stability from the above-described gel composition. The gelation rate is defined as the degree of gel formation as a function of time or, synonymously, the rate of crosslinking in the gel. The degree of crosslinking may be quantified in terms of several variables including gel strength. Gel strength of a nonflowing gel is defined as the resistance of the gel to deformation or fracturing. Thermal stability is the ability of a gel to withstand temperature extremes without degradation.

Tailor-making or customizing a gel in the manner of the present invention to meet the performance requirements of a particular drilling operation is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the aqueous solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing, quantitative viscosimetric analysis, yield stress testing, filtration tests and core flooding experiments. The operable ranges of a number of gelation parameters and their correlation with the dependent variable are described below.

The lower temperature limit of the gel at the surface is its freezing point and the upper limit is essentially the thermal stability limit of the polymer. The gel is generally maintained at ambient temperature or higher at the surface. The temperature may be adjusted by heating or cooling the aqueous solvent. Increasing the temperature within the prescribed range increases the gelation rate.

The initial pH of the gel is within a range of about 3 to 13 and preferably about 6 to 13. Although gelation can occur at an acidic pH, lowering the initial pH below 7 does not favor gelation. The initial pH is most preferably alkaline, i.e., greater than 7.0 to about 13. When the polymer is PHPA, increasing the pH within the prescribed range increases the rate of gelation.

The polymer concentration in the gel is about 500 ppm up to the solubility limit of the polymer in the solvent or the rheological constraints of the polymer solution, preferably about 750 to about 200,000 ppm, and most preferably about 4000 to about 80,000 ppm. Increasing the polymer concentration increases the gelation rate and ultimate gel strength at a constant ratio of polymer to crosslinking agent.

The ionic strength of the aqueous solvent can be from that of deionized distilled water to that of a brine having an ion concentration approaching the solubility limit of the brine. Generally, fresh water has a total dissolved solids concentration below 500 ppm and a produced brine has a total dissolved solids concentration above 500 ppm. Thus, fresh water and produced brines fall within the useful range of the present invention. Increasing the ionic strength of the solution can increase the gelation rate.

The weight ratio of polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

The degree of hydrolysis for an acrylamide polymer is about 0 to 60% and preferably about 0 to 30%. Within the preferred range, increasing the degree of hydrolysis in most cases increases the gelation rate. Increasing the molecular weight of the polymer increases the gel strength.

It is apparent from these correlations that one can produce gels across a very broad range of gelation rates and gel properties as a function of the gelation conditions. Thus, to produce an optimum nonflowing gel according to the present process, the practitioner predetermines the gelation rate and properties of a gel which would meet the performance requirements of a given situation and thereafter produces a nonflowing gel having these predetermined characteristics. The performance requirements include in situ conditions such as temperature, pressure, drilling operating parameters, and formation geology. Analytical methods known to one skilled in the art are used to determine the performance requirements.

Generally, the gel is required to have sufficient strength to substantially eliminate or reduce lost circulation of a drilling fluid when an appropriate amount of the gel is placed in the wellbore. By "reducing lost circulation", it is meant that the degree of lost circulation experienced when using a drilling fluid after a nonflowing gel treatment is less than the degree of lost circulation experienced when a conventional drilling fluid is used in the absence of the nonflowing gel treatment. The strength of the gel can be enhanced by the suspension of inert solids in the gel, including inert insoluble inorganic solids such as sand and fiberglass or inert insoluble organic solids such as cellulosic and plastic fibers.

After the gel composition has been formulated in the above-described manner, it is injected as a partial gel into the wellbore being treated. The partial gel is placed at a face or in voids where it is desired to prevent or remedy lost circulation and the partial gel goes to complete gelation, setting up as a nonflowing gel. Placement of the gel can be facilitated by the use of zone isolation packers if desired.

A "partial gel" as referred to herein has at least one chemically crosslinked site. The partial gel may or may not manifest the physical properties of a crosslinked gel, but the partial gel is capable of further crosslinking to completion in situ, resulting in a gel having the desired properties without the addition of more crosslinking agent. The partial gel preferably has sufficient viscosity and/or plugging efficiency to substantially prevent or reduce gel leakoff into the formation during or subsequent to its placement.

"Complete gelation" means that the gel composition is nonflowing and is incapable of further crosslinking because one or both of the required reactants in the initial solution are consumed. Further crosslinking is only possible if either more polymer, crosslinking agent, or both are added to the gel composition.

The present invention can be practiced according to a number of different embodiments. In one embodiment of the invention, the gel is placed in the wellbore or in voids in direct communication with the wellbore after at least a portion of the wellbore has been drilled out by a conventional drilling operation, but before any significant lost circulation is detected. Drilling is suspended during placement of the gel and resumes after gelation is complete. The gel in place acts as a lost circulation preventative.

In another embodiment of the present invention, the gel is employed in a remedial role. When lost circulation is detected during a drilling operation using a conventional drilling fluid, drilling is suspended and the gel is placed in the wellbore or in voids in direct communication with the wellbore. Once the gel is in place, drilling is resumed with the gel eliminating or reducing further lost circulation. Upon resumption of drilling, it may be necessary to drill through residual gel which has set up in the bore hole. However, this will not substantially impede the wellbore drilling operation.

In a similar embodiment, the gel may be utilized in a remedial role, but after the failure of a conventional lost circulation treatment. For example, if large volumes of a conventional lost circulation material, such as Portland cement, are being lost to voids in direct communication with the wellbore and there is little apparent reduction in lost circulation, the conventional treatment is deemed ineffective. Therefore, the treatment process of the present invention is performed in the same manner as described above to effectively plug the voids where the conventional treatment has failed.

This embodiment may by further augmented by subsequently placing the conventional Portland cement adjacent the gel once the gel has set up in the voids. The gel prevents the Portland cement from being lost out into voids, while the Portland cement enhances the strength of the gel plug.

The amount of gel employed in the present process is dependent on the geological properties of the formation as well as the drilling operating conditions. The most common application for the present process are situations where voids in direct communication with the wellbore are encountered during drilling. In such cases large volumes of gel (on the order of 500 barrels or more) can be necessary to practice the process of the present invention. Where no voids are encountered during drilling, a considerably smaller volume of gel may be required to inhibit lost circulation.

It is believed the gel functions to plug faces and voids according to the lost circulation treatment of the present invention by coating the faces and at least partially filling the voids which are in direct communication with the wellbore. In doing so, the gel prevents or reduces the flow of drilling fluids out of the wellbore into the matrix or voids in direct communication with the wellbore.

The following definitions apply to the present invention. "Plugging" is a substantial reduction in permeability. The term "face" includes the walls of the wellbore and the walls or boundaries of voids in direct communication with the wellbore. The "wellbore" is the bore hole formed by the drill bit in the formation. "Voids" are not formed by the drill bit, but are nevertheless anomalies having a permeability substantially equal to that of the bore hole relative to that of the matrix. Voids include fractures, fracture networks, caverns, vugs, cavities, washouts, cobble packs, unconsolidated sands, and the like, which may extend far away from the wellbore. The "matrix" is homogeneous, continuous, sedimentary material having a permeability, which is substantially less than that of the wellbore or voids. "Direct communication" means that the voids are not separated from the wellbore by intervening matrix.

As noted above, the present invention is practiced in conjunction with a drilling operation. After the drilling operation is completed, the well may be utilized for its intended purpose, i.e., recovery of hydrocarbon fluids from the formation or injection of fluids into the formation. Since the gel does not significantly penetrate the formation matrix beyond about 1 centimeter from the face, the gel is nondamaging to the formation matrix to the extent that it does not substantially inhibit subsequent recovery or injection of fluids. Even if the gel unacceptably inhibits the recovery or injection of fluids, the problem can be remedied by perforating the matrix beyond the layer of gel penetration.

If further removal of residual gel from the wellbore or voids is desired, it can be readily accomplished because the gels employed in the process of the present invention are generally reversible. The gels can be reversed with a conventional breaker, such as peroxides, hypochlorites or persulfates. The breaker can be incorporated into the initial gel composition at the surface to slowly break the gel over time or the breaker can be placed in the wellbore separately to reverse the gel on contact at the desired time.

The following examples demonstrate the practice and utility of the present invention, but are not to be construed as limiting the scope thereof.

The following table is useful in interpreting the qualitative data set forth in the examples below. Gels A-E are flowing gels and gels F-J are nonflowing gels.

| Code | Gel Strength Code |
|------|-------------------|
| A | No detectable gel formed: the gel appears to have the same viscosity as the original polymer solution and the gel is not visually detectable. |
| B | Highly flowing gel: the gel appears to be only slightly more viscous than the initial polymer solution. |
| C | Flowing gel: almost all of the detectable gel flows to the bottle cap upon inversion. |
| D | Moderately flowing gel: most of the gel flows to the bottle cap upon inversion but a portion does not (about 5 to 15%); this gel is often characterized as a "tonguing" gel. |
| E | Barely flowing gel: the gel barely flows to the bottle cap or a significant portion (>15%) of the gel does not flow upon inversion. |
| F | Highly deformable nonflowing gel: the gel deforms but does not reach all the way to the bottle cap upon inversion. |
| G | Moderately deformable nonflowing gel: the gel deforms only about half way down the bottle upon inversion. |
| H | Slightly deformable nonflowing gel: the gel surface only slightly deforms upon inversion. |
| I | Rigid gel: the gel surface does not deform upon |

| Code | Gel Strength Code |
|---|---|
| | inversion. |
| J | Ringing rigid gel: a mechanical vibration like a tuning fork can be felt after tapping the bottle. |

The polymer solutions of the following examples are prepared by combining an aqueous acrylamide polymer solution with crosslinking agent solution in a 0.12 liter wide mouth bottle to form a 0.05 liter sample. The sample is gelled in the capped bottle and the qualitative gel strength is determined by periodically inverting the bottle.

In all of the examples, the acrylamide polymer is partially hydrolyzed polyacrylamide (PHPA), which is 30% hydrolyzed. The crosslinking agent solution is a complex or mixture of complexes comprising chromium III and acetate ions prepared by dissolving solid $CrAc_3 \cdot H_2O$ or $Cr_3Ac_7(OH)_2$ in water or diluting a solution obtained commercially under the label of "Chromic Acetate 50% Solution". The aqueous solvent is Denver, Colo. U.S.A. tap water unless stated otherwise.

EXAMPLE 1

The PHPA has a molecular weight of 11,000,000 and the aqueous solvent is an NaCl brine having a concentration of 5,000 ppm. The pH of the gelation solution is 8.6, the temperature is 22° C. and the weight ratio of PHPA to chromium III is 44:1. The data table below shows that the gel strength can be varied by varying the polymer concentration in the gelation solution while holding the ratio of polymer to crosslinking agent constant.

TABLE 1

| Run No. | 1 | 2 | 3 | 4 |
|---|---|---|---|---|
| ppm PHPA | 20,000 | 15,000 | 10,000 | 7,500 |
| ppm $Cr^{III}$ | 454 | 341 | 227 | 170 |
| Time (hr) | | Gel Code | | |
| 1.0 | E | D | C | B |
| 2.0 | H | E | C | B |
| 3.0 | H | E | C | B |
| 4.0 | H | E | C | B |
| 5.0 | H | F | C | C |
| 6.0 | H | G | C | C |
| 24 | H | H | E | D |
| 48 | I | I | F | E |
| 72 | I | I | G | F |
| 96 | I | I | G | F |
| 168 | J | J | H | F |
| 300 | J | J | H | F |
| 600 | J | J | H | F |
| 1200 | J | J | H | F |
| 2400 | J | J | H | F |

EXAMPLE 2

The PHPA has a molecular weight of 5,000,000 and has a concentration of 8400 ppm in the gelation solution. The aqueous solvent is an NaCl brine having a concentration of 5000 ppm. The temperature is 22° C. and the weight ratio of PHPA to chromium III is 40:1. The data table below shows that the gelation rate can be varied as a function of pH.

TABLE 2

| Polymer Solution pH | 10.6 | 8.0 | 7.0 | 6.0 | 4.0 |
|---|---|---|---|---|---|
| Time (hr) | | | Gel Code | | |
| 0.5 | A | A | A | A | A |
| 1.0 | A | A | A | A | A |
| 1.5 | A | A | A | A | A |
| 2.0 | B | A | A | A | A |
| 2.5 | B | A | A | A | A |
| 4.0 | B | B | A | A | A |
| 5.0 | C | B | A | A | A |
| 6.0 | C | B | B | A | A |
| 7.0 | C | B | B | B | A |
| 8.0 | C | C | B | B | B |
| 24 | E | C | C | B | B |
| 28 | E | C | C | C | C |
| 48 | E | D | C | C | C |
| 80 | G | E | C | C | C |
| 168 | H | F | D | D | D |
| 600 | H | F | D | D | E |
| 2040 | H | G | F | F | G |

EXAMPLE 3

A series of gels are prepared under the same conditions as Example 2, but at a neutral pH of 7. Common oil field salts are added to the gelation solutions during formulation. The data table below shows that gels can be formed which are relatively insensitive to a number of common oil field salts.

TABLE 3

| Run No. | 1 | 2 | 3 | 4 | 5 | 6 | 7 |
|---|---|---|---|---|---|---|---|
| Salt | none (control) | $CaCl_2$ | $Na_2SO_4$ | $NH_4Cl$ | KCl | $NaHCO_3$ | $Na_2CO_3$ |
| ppm Salt | — | 1000 | 3000 | 100 | 400 | 2000 | 100 |
| Time (hr) | | | | Gel Code | | | |
| 1.0 | A | A | A | A | A | A | A |
| 4.0 | A | A | A | A | A | A | A |
| 5.0 | B | B | B | B | B | B | B |
| 6.0 | B | B | B | B | B | B | B |
| 7.0 | B | B | B | B | B | B | B |
| 8.0 | C | C | C | C | C | B | B |
| 24 | C | C | C | C | C | C | C |
| 72 | D | D | D | D | D | D | D |
| 120 | E | E | E | D | D | E | E |
| 264 | E | F | F | F | F | F | F |
| 288 | E | F | F | F | F | F | F |
| 408 | E | F | F | F | F | F | F |

EXAMPLE 4

The PHPA has a molecular weight of 11,000,000 and has a concentration of 8,000 ppm. The weight ratio of polymer to crosslinking agent is 66:1 and the chromium III concentration is 121 ppm. The aqueous solvent is a synthetic oil field brine at a pH of 7.5 and a temperature of 22° C. The composition of the synthetic brine is set forth below. The data table below shows that utilitarian gels can be formed in oil field brines.

TABLE 4

| Time (hr) | Gel Code |
|---|---|
| 0.25 | A |
| 0.5 | B |
| 4.0 | B |
| 5.0 | C |
| 6.0 | C |
| 7.0 | D |
| 24 | D |
| 96 | G |
| 150 | G |
| 197 | H |
| 936 | H |

TABLE 4-continued

| Synthetic Brine Composition | g/l |
| --- | --- |
| $Na_2CO_3$ | 0.249 |
| $NH_4Cl$ | 0.086 |
| $CaCl_2$ | 0.821 |
| $MgCl_2.6H_2O$ | 1.78 |
| $Na_2SO_4$ | 1.09 |
| NaCl | 6.89 |

EXAMPLE 5

The PHPA has a molecular weight of 5,000,000 and has a concentration of 8000 ppm. The weight ratio of polymer to crosslinking agent is 88:1 and the chromium III concentration is 91 ppm. The aqueous solvent is an oil field brine having an $H_2S$ concentration greater than 100 ppm and a total dissolved solids concentration of 0.33% by weight. The composition of the solvent is shown below. The pH of the gelation solution is 9.0 and the temperature is 60° C. The data table below shows that utilitarian gels can be formed in the presence of $H_2S$ and at an elevated temperature.

TABLE 5

| Time (hr) | Gel Code |
| --- | --- |
| 0.5 | A |
| 1.0 | C |
| 1.5 | D |
| 2.0 | E |
| 3.0 | F |
| 4.0 | F |
| 5.0 | F |
| 7.0 | F |
| 12 | F |
| 27 | F |
| 75 | F |
| 173 | F |
| 269 | F |
| 605 | F |

| Synthetic Brine Composition | ppm |
| --- | --- |
| $Na^+$ | 252 |
| $Mg^{2+}$ | 97 |
| $Ca^{2+}$ | 501 |
| $Cl^-$ | 237 |
| $SO_4^{2-}$ | 1500 |
| $HCO_3^-$ | 325 |

EXAMPLE 6

A gelation solution is prepared wherein the PHPA has a molecular weight of 5,000,000 and the aqueous solvent is an NaCl brine having a concentration of 3,000 ppm. The concentration of PHPA in the gelation solution is 5,000 ppm, the pH of the gelation solution is 10.2, the temperature is 105° F. and the weight ratio of PHPA to chromium III is 32:1. The gelation solution is aged for one hour after mixing at which time no gel is visually detected by bottle testing. 50 cm³ of gel sample is placed in a Millipore filter holder. A pressure of 50 psi is applied to the gel in an effort to drive the gel through an 8 micron cellulose-acetate Millipore filter having a 47 mm diameter. Only 0.8 cm³ of gelation solution passes through the filter after 10 minutes of applied pressure. An entire 50 cm³ of polymer solution without crosslinking agent passes through the filter in 2.6 minutes under identical experimental conditions.

The results show that the gelation solution is sufficiently crosslinked after only one hour of aging to render it essentially unfilterable. Likewise a gelation solution that cannot pass through an 8 micron filter would not be expected to significantly permeate competent formation matrix rock having a permeability less than 1000 md. Thus, the gel of the present invention sets up at the wellbore face without substantially penetrating the matrix.

EXAMPLE 7

A mature gel is prepared by crosslinking PHPA with a chromic acetate complex. The PHPA has a molecular weight of 11,000,000 and is diluted to a concentration of 5000 ppm in a synthetic injection water. About 0.5 l of the gel is injected for 14 hours across the face of a 35 md Midcontinent Field carbonate core plug while a 42 psi differential pressure is applied to the length of the plug. The core plug is 2.7 cm long and has a diameter of 2.5 cm. A clear filtrate having essentially the viscosity of water is produced from the core plug.

After gel injection, the core plug is flooded for two days with about 8 pore volumes of brine until the permeability of the core plug stabilizes at 4.1 microdarcies ($k_{final}/k_{initial}=0.00012$). Thereafter, the first 4 mm of core material from the injection face are cut away from the core. The permeability of the remaining plug slightly exceeds the initial permeability of the plug (35 md).

The results indicate that permeability reduction is confined to the core material in the first 4 mm from the injection face. Thus, the gel does not substantially invade formation rock and does not cause permeability reduction in the matrix a significant distance from the wellbore face.

EXAMPLE 8

A gel is prepared by mixing polyacrylamide with a chromic acetate complex in solution. The polyacrylamide has a molecular weight of 11,000,000, the concentration of polyacrylamide in the gelation solution is 22,000 ppm, the weight ratio of polyacrylamide to chromium III is 80:1, and the aqueous solvent is fresh water. The gelation solution is initially aged at 60° C. The mature gel does not flow through a 1.5 mm inside diameter orifice during five days at an applied pressure of 3450 kPa and a temperature of 24° C., which is a relatively high oil-bearing formation temperature. The same test is repeated at temperatures down to 22° C. with comparable results. Thus, it is concluded that the yield pressure of the mature gel into the orifice exceeds 3450 kPa within a temperature range of 2° C. to 124° C.

EXAMPLE 9

An offshore oil well is being drilled into a formation in an offshore semi-arctic environment. Lost circulation and a slow gas kick is detected when drilling through a combination of a coal bed and cobbles encountered at a depth of 216 meters below the sea floor. The downhole temperature at this depth is about 5.5° C.

425 sacks of Portland cement are pumped into the wellbore at a rate of 28 barrels per minute in an effort to effect a lost circulation treatment. However, no pressure buildup is detected in the wellbore.

The Portland cement treatment is deemed a failure and is followed by the gel treatment of the present invention. 500 barrels of a gelation solution is injected into the wellbore. The gel solution comprises PHPA and a crosslinking agent made up of 80% chromic acetate complex by weight and 20% chromic chloride by weight. The PHPA has a molecular weight of 15,000,000 and is 5% hydrolyzed. The ratio of PHPA to crosslinking agent is 17.5:1 by weight and the aqueous solvent is sea water.

After injection of the gelation solution, the wellbore is shut in for 6 hours allowing the gel to set-up. Thereafter, 100 additional sacks of Portland cement are pumped into the wellbore, although with substantial difficulty due to the presence of the gel. The treatment effectively eliminates lost circulation of drilling fluid while preventing gas kicks from the strata of the formation comprising the coal bed and cobbles. As a result the well is successfully drilled, completed, and produced.

While the foregoing preferred embodiments of the invention have been described and shown, it is understood that the alternatives and modifications, such as those suggested and others, may be made thereto and fall within the scope of the invention.

I claim:

1. A process for preventing significant lost circulation of a drilling fluid across a face in a formation while drilling a wellbore in said formation having a matrix below an earthen surface, the process comprising:
   (a) suspending drilling of said wellbore;
   (b) admixing components of a continuous nonflowing gel at the surface to form a flowing partial gel having an initial pH of about 3 to about 13 and comprising a water-soluble carboxylate-containing polymer, a complex capable of crosslinking said polymer and formed of at least one electropositive chromium III species and at least one electronegative carboxylate species, and an aqueous solvent for said polymer and said complex;
   (c) injecting said partial gel into said wellbore and placing said partial gel at a face in direct communication with said wellbore;
   (d) forming said nonflowing gel from said partial gel at said face to prevent significant lost circulation across said face; and
   (e) resuming drilling of said wellbore.

2. The process of claim 1 wherein said complex is additionally formed of at least one species selected from the group consisting of electronegative oxygen species, electronegative hydroxide species, inorganic monovalent ions, inorganic divalent ions, water molecules and mixtures thereof.

3. The process of claim 1 wherein said aqueous solvent is a produced brine.

4. The process of claim 1 wherein said carboxylate-containing polymer is an acrylamide polymer.

5. The process of claim 1 wherein said carboxylate-containing polymer is selected from the group consisting of polyacrylamide and partially hydrolyzed polyacrylamide.

6. The process of claim 5 wherein said electronegative carboxylate species is acetate.

7. The process of claim 1 wherein said partial and nonflowing gels don not substantially penetrate said matrix.

8. The process of claim 1 wherein said gel has an initial pH of about 6 to about 13.

9. The process of claim 8 wherein said gel has an initial pH greater than 7 to 13.

10. A process of preventing significant lost circulation of a drilling fluid into voids in a subterranean formation while drilling a wellbore in said formation below an earthen surface, wherein said voids are in direct communication with said wellbore, the process comprising:
    (a) suspending drilling of said wellbore;
    (b) admixing components of a continuous nonflowing gel at the surface to form a flowing partial gel having an initial pH of about 3 to about 13 and comprising a water-soluble carboxylate-containing polymer, a complex capable of crosslinking said polymer and formed of at least one electropositive chromium III species and at least one electronegative carboxylate species, and an aqueous solvent for said polymer and said complex;
    (c) injecting said partial gel into said wellbore and placing said partial gel in said voids;
    (d) forming said nonflowing gel from said partial gel in said voids to prevent significant lost circulation into said voids; and
    (e) resuming drilling of said wellbore.

11. The process of claim 10 wherein said complex is additionally formed of at least one species selected from the group consisting of electronegative oxygen species, electronegative hydroxide species, inorganic monovalent ions, inorganic divalent ions, water molecules and mixtures thereof.

12. The process of claim 10 wherein said aqueous solvent is a produced brine.

13. The process of claim 10 wherein said carboxylate-containing polymer is an acrylamide polymer.

14. The process of claim 10 wherein said carboxylate-containing polymer is selected from the group consisting of polyacrylamide and partially hydrolyzed polyacrylamide.

15. The process of claim 14 wherein said electronegative carboxylate species is acetate.

16. The process of claim 10 wherein said partial and nonflowing gels do not substantially penetrate said formation matrix.

17. The process of claim 10 wherein said gel has an initial pH of about 6 to about 13.

18. The process of claim 17 wherein said gel has an initial pH greater than 7 to about 13.

19. A process for substantially reducing lost circulation of a drilling fluid across a face in a subterranean formation while drilling a wellbore in said formation having a matrix below an earthen surface, the process comprising:
    (a) monitoring the circulation of said drilling fluid while drilling said wellbore in said formation;
    (b) suspending drilling of said wellbore in response to lost circulation of said frilling fluid;
    (c) admixing components of a continuous nonflowing gel at the surface to form a flowing partial gel having an initial pH of about 3 to about 13 and comprising a water-soluble carboxylate-containing polymer, a complex capable of crosslinking said polymer and formed of at least one electropositive chromium III species and at least one electronegative carboxylate species, and an aqueous solvent for said polymer and said complex;
    (d) injecting said partial gel into said wellbore and placing said partial gel at a face in direct communication with said wellbore;
    (e) forming said nonflowing gel from said partial gel at said face to substantially reduce lost circulation across said face; and
    (f) resuming drilling of wellbore.

20. The process of claim 19 wherein said complex is additionally formed of at least one species selected from the group consisting of electronegative oxygen species, electronegative hydroxide species, inorganic monovalent ions, inorganic divalent ions, water molecules and mixtures thereof.

21. The process of claim 19 wherein said aqueous solvent is a produced brine.

22. The process of claim 19 wherein said carboxylate-containing polymer is an acrylamide polymer.

23. The process of claim 19 wherein said carboxylate-containing polymer is selected from the group consisting of polyacrylamide and partially hydrolyzed polyacrylamide.

24. The process of claim 23, wherein said electronegative carboxylate species is acetate.

25. The process of claim 19 wherein said partial and nonflowing gels do not substantially penetrate said formation matrix.

26. The process of claim 19 wherein said gel has an initial pH of about 6 to about 13.

27. The process of claim 26 wherein said gel has an initial pH greater than 7 to about 13.

28. A process for substantially reducing lost circulation of a drilling fluid into voids in a subterranean formation while drilling a wellbore in said formation below an earthen surface, wherein said voids are in direct communication with said wellbore, the process comprising:
(a) monitoring the circulation of said drilling fluid while drilling said wellbore in said formation;
(b) suspending drilling of said wellbore in response to lost circulation of said drilling fluid;
(c) admixing components of a continuous nonflowing gel at the surface to form a flowing partial gel having an initial pH of about 3 to about 13 and comprising a water-soluble carboxylate-containing polymer, a complex capable of crosslinking said polymer and formed of at least one electropositive chromium III species and at least one electronegative carboxylate species and an aqueous solvent for said polymer and said complex;
(d) injecting said partial gel into said wellbore and placing said partial gel in said voids;
(e) forming said nonflowing gel from said partial gel in said voids to substantially reduce lost circulation into said voids; and
(f) resuming drilling of said wellbore.

29. The process of claim 28 wherein said complex is additionally formed of at least one species selected from the group consisting of electronegative oxygen species, electronegative hydroxide species, inorganic monovalent ions, inorganic divalent ions, water molecules and mixtures thereof.

30. The process of claim 28 wherein said aqueous solvent is a produced brine.

31. The process of claim 28 wherein said carboxylate-containing polymer is an acrylamide polymer.

32. The process of claim 28 wherein said carboxylate-containing polymer is selected from the group consisting of polyacrylamide and partially hydrolyzed polyacrylamide.

33. The process of claim 32 wherein said electronegative carboxylate species is acetate.

34. The process of claim 28 wherein said partial and nonflowing gels do not substantially penetrate said formation matrix.

35. The process of claim 28 wherein said gel has an initial pH of about 6 to about 13.

36. The process of claim 35 wherein said gel has an initial pH greater than 7 to about 13.

37. A process for substantially reducing lost circulation of a drilling fluid out of a wellbore when drilling said wellbore in a formation having a matrix below an earthen surface, wherein drilling of said wellbore has been suspended and said wellbore has been treated with a first lost circulation material which has not sufficiently reduced lost circulation, the process comprising:
(a) admixing components of a continuous nonflowing gel as a second lost circulation material at the surface to form a flowing partial gel having an initial pH of about 3 to about 13 and comprising a water-soluble carboxylate-containing polymer, a complex capable of crosslinking said polymer and formed of at least one electropositive chromium III species and at least one electronegative carboxylate species and an aqueous solvent for said polymer and said complex;
(b) injecting said partial gel into said wellbore and placing said partial gel at a face or in a void in direct communication with said wellbore;
(c) forming said nonflowing gel from said partial gel at said face or in said void to substantially reduce lost circulation out of said wellbore; and
(d) resuming drilling of said wellbore.

38. The process of claim 37 wherein said complex is additionally formed of at least one species selected from the group consisting of electronegative oxygen species, electronegative hydroxide species, inorganic monovalent ions, inorganic divalent ions, water molecules and mixtures thereof.

39. The process of claim 37 wherein said aqueous solvent is a produced brine.

40. The process of claim 37 wherein said carboxylate-containing polymer is an acrylamide polymer.

41. The process of claim 37 wherein said carboxylate-containing polymer is selected from the group consisting of polyacrylamide and partially hydrolyzed polyacrylamide.

42. The process of claim 33 wherein said electronegative carboxylate species is acetate.

43. The process of claim 37 wherein said partial and nonflowing gels do not substantially penetrate said matrix.

44. The process of claim 37 further comprising the step of placing said first lost circulation material adjacent said nonflowing gel at said wellbore face or in said void after step (c) to augment said nonflowing gel.

45. The process of claim 37 wherein said first lost circulation material is Portland cement.

46. The process of claim 37 wherein said gel has an initial pH of about 6 to about 13.

47. The process of claim 46 wherein said gel has an initial pH greater than 7 to about 13.

* * * * *

UNITED STATES PATENT AND TRADEMARK OFFICE
CERTIFICATE OF CORRECTION

PATENT NO. : 4,957,166
DATED : September 18, 1990
INVENTOR(S) : Robert D. Sydansk It is certified that error appears in the above-identified patent and that said Letters Patent is hereby corrected as shown below:

| | |
|---|---|
| Cover page, Assignee: | Delete "Marath" and insert therefor --Marathon--. |
| Cover page, References Cited, line 4: | Delete "172/72" and insert therefor --175/72--. |
| Cover page, Other Publications, line 12: | Delete "Jdy" and insert therefor --Udy--. |
| Cover page, Abstract, line 5: | Delete "crosskinging" and insert therefor --crosslinking--. |
| Col. 3, line 38: | Delete "there" and insert therefor --these--. |
| Col. 4, line 30: | Delete "weigh" and insert therefor --weight--. |
| Col. 4, line 30: | Delete "Carboxylic" and insert therefor --Carboxylate--. |
| Col. 5, line 6: | After "in" insert --an--. |
| Col. 5, line 13: | Delete "alternative" and insert therefor --alternatives--. |
| Col. 9, line 10: | After "with" insert --a--. |
| Col. 12, line 43: | Delete "24" and insert therefor --124--. |
| Col. 12, line 48: | Delete "2" and insert therefor --22--. |
| Col. 13, line 56: | Delete "don" and insert therefor --do--. |
| Col. 13, line 61: | After "to" insert --about--. |
| Col. 13, line 62: | Delete "of" and insert therefor --for--. |
| Col. 14, line 64: | After "of" insert --said--. |
| Col. 16, line 46: | Delete "33" and insert therefor --41". |

Signed and Sealed this

Seventh Day of January, 1992

Attest:

HARRY F. MANBECK, JR.

Attesting Officer    Commissioner of Patents and Trademarks